United States Patent
Tsuji et al.

(10) Patent No.: US 8,456,754 B2
(45) Date of Patent: Jun. 4, 2013

(54) ZOOM LENS BARREL

(75) Inventors: Kanji Tsuji, Tokyo (JP); Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/208,505

(22) Filed: Aug. 12, 2011

(65) Prior Publication Data
US 2012/0044579 A1 Feb. 23, 2012

(30) Foreign Application Priority Data

Aug. 17, 2010 (JP) ................................ 2010-182052
Sep. 13, 2010 (JP) ................................ 2010-204664

(51) Int. Cl.
*G02B 15/14* (2006.01)
*G02B 7/02* (2006.01)

(52) U.S. Cl.
USPC ............ 359/700; 359/701; 359/704; 359/819

(58) Field of Classification Search
USPC .................. 359/694–704, 811–830
See application file for complete search history.

(56) References Cited

U.S. PATENT DOCUMENTS

| 2010/0172032 A1* | 7/2010 | Fukino .......................... 359/700 |
| 2010/0214670 A1* | 8/2010 | Matsumoto et al. .......... 359/699 |
| 2012/0281298 A1* | 11/2012 | Fukino .......................... 359/700 |

FOREIGN PATENT DOCUMENTS

| JP | 2005-017980 | 1/2005 |
| JP | 2010-008802 | 1/2010 |

* cited by examiner

*Primary Examiner* — Mohammed Hasan
(74) *Attorney, Agent, or Firm* — Cowan, Liebowitz & Latman, P.C.

(57) ABSTRACT

A zoom lens barrel includes a base member 1001, a linear cylinder 700 fixed on the base member 1001, a cam cylinder 800 configured to be rotatable with respect to the linear cylinder 700, a ball member 701 and a pin member 702 provided on the linear cylinder 700, and a plurality of optical component units. The cam cylinder 800 includes a cam groove 800*d* that the ball member 701 contacts and that determines a position in an optical axis direction of the cam cylinder 800 with respect to the linear cylinder 700, and a cam groove 800*i* that the pin member 702 engages with in a radial direction of the cam cylinder 800 and that the pin member 702 contacts in two directions different from each other that are the optical axis direction.

4 Claims, 18 Drawing Sheets

ZOOM LENS BARREL

BACKGROUND OF THE INVENTION

1. Field of the Invention

The present invention relates to a zoom lens barrel that extends in an optical axis direction to be able to perform a zoom operation and to be retracted in a lens barrel body.

2. Description of the Related Art

Previously, in order to significantly move a lens unit in an optical axis direction to change a focal length, a zoom lens barrel has included a linear cylinder and a cam cylinder that is fitted on an outside diameter or an internal diameter of the linear cylinder to be supported so as to be rotatable around an optical axis and movable in the optical axis direction.

Japanese Patent Laid-Open No. 2005-017980 discloses a lens barrel that includes a whole unit cam groove and a whole unit pin in order to move a cam cylinder with respect to a linear cylinder. It also discloses a configuration in which a whole unit auxiliary pin cam groove and a whole unit impact cam groove are provided adjacent to the whole unit cam groove to treat them as a receiver with respect to an external pressure in an optical axis direction.

However, in the lens barrel disclosed in Japanese Patent Laid-Open No. 2005-017980, a backlash between the linear cylinder and the cam cylinder in a radial direction is easily generated at an end of a side where the whole unit cam groove is provided and an end of the opposite side in the optical axis direction. As a result, the lens unit is also tilted since the cam cylinder is tilted, and therefore an optical performance may be deteriorated.

In an optical apparatus such as a digital still camera, similarly to a digital video camera or the like, a function of taking a moving image in addition to taking a still image is obtained. In taking the moving image, a smooth zoom operation during which an image is less shaken and a high magnification are required. However, a lens barrel gets heavy when the magnification is higher, and the impact which is given by the drop is large. Therefore, the lens barrel which is strong for an external force such as an impact is necessary. Japanese Patent Laid-Open No. 2010-8802 discloses a lens barrel which improves a proof strength of a cam groove for the external force such as the impact.

However, in the lens barrel disclosed in Japanese Patent Laid-Open No. 2010-8802, although it is strong for the drop from the cam groove of a cam follower pin, a dent is formed on the cam groove when the impact is given. Therefore, when the cam follower pin passes the cam groove having the dent after the impact is given, the image shake is generated and it is difficult to perform a smooth zoom operation.

SUMMARY OF THE INVENTION

The present invention provides a zoom lens barrel that suppresses a backlash in a radial direction of a linear cylinder and a cam cylinder and improves a fitting accuracy of the linear cylinder and the cam cylinder to suppress the tilt of a lens unit to improve an optical performance, and that achieves a smooth zoom operation even when a lens holding frame has an impact.

A zoom lens barrel as one aspect of the present invention includes a base member, a linear cylinder fixed on the base member, a cam cylinder configured to be rotatable with respect to the linear cylinder, a first cam follower and a second cam follower provided on the linear cylinder, and a plurality of optical component units. The cam cylinder includes a first cam portion that the first cam follower contacts to determine a position in an optical axis direction of the cam cylinder with respect to the linear cylinder, and a second cam portion that the second cam follower engages with in a radial direction of the cam cylinder and that the second cam follower contacts in two directions different from each other that are the optical axis direction.

Further features and aspects of the present invention will become apparent from the following description of exemplary embodiments with reference to the attached drawings.

DESCRIPTION OF THE PREFERRED EMBODIMENTS

Figure 1:
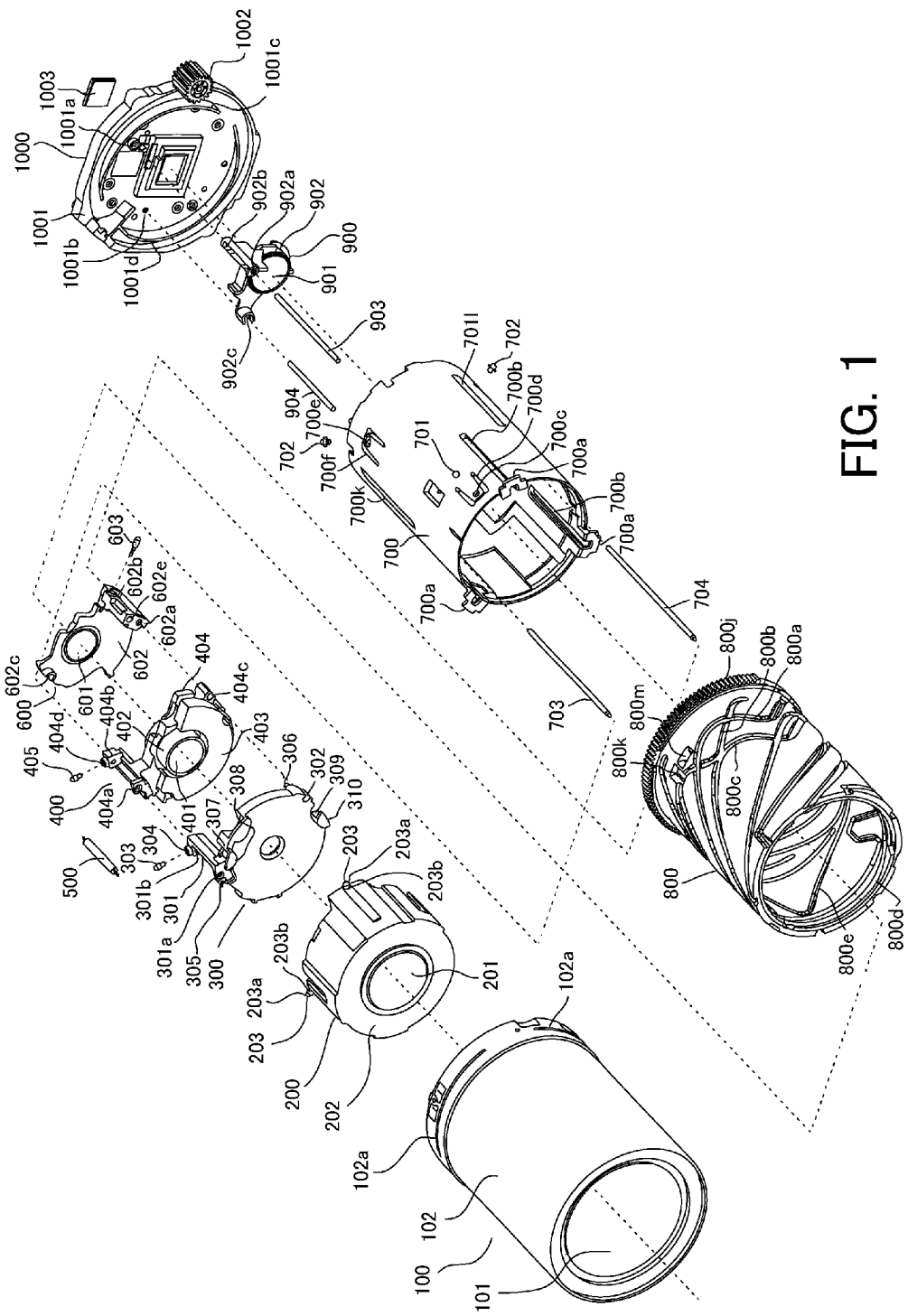
FIG. 1 is an exploded perspective view illustrating a whole of a zoom lens barrel in the present embodiment.

Exemplary embodiments of the present invention will be described below with reference to the accompanied drawings. In each of the drawings, the same elements will be denoted by the same reference numerals and the duplicate descriptions thereof will be omitted.

Figure 2:
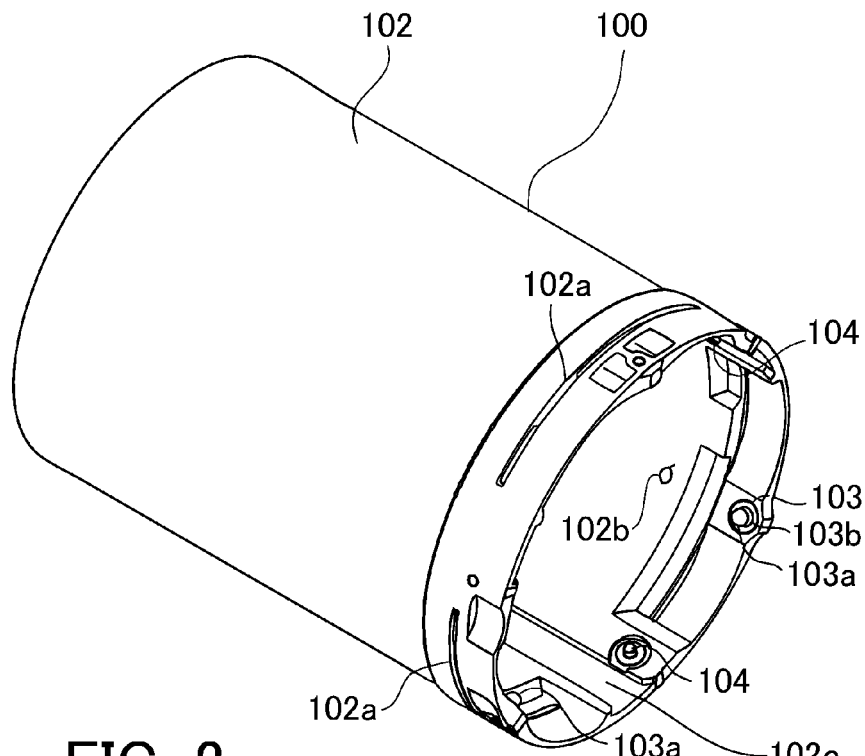
FIG. 2 is a perspective view illustrating a first unit in the present embodiment.
Figure 3:
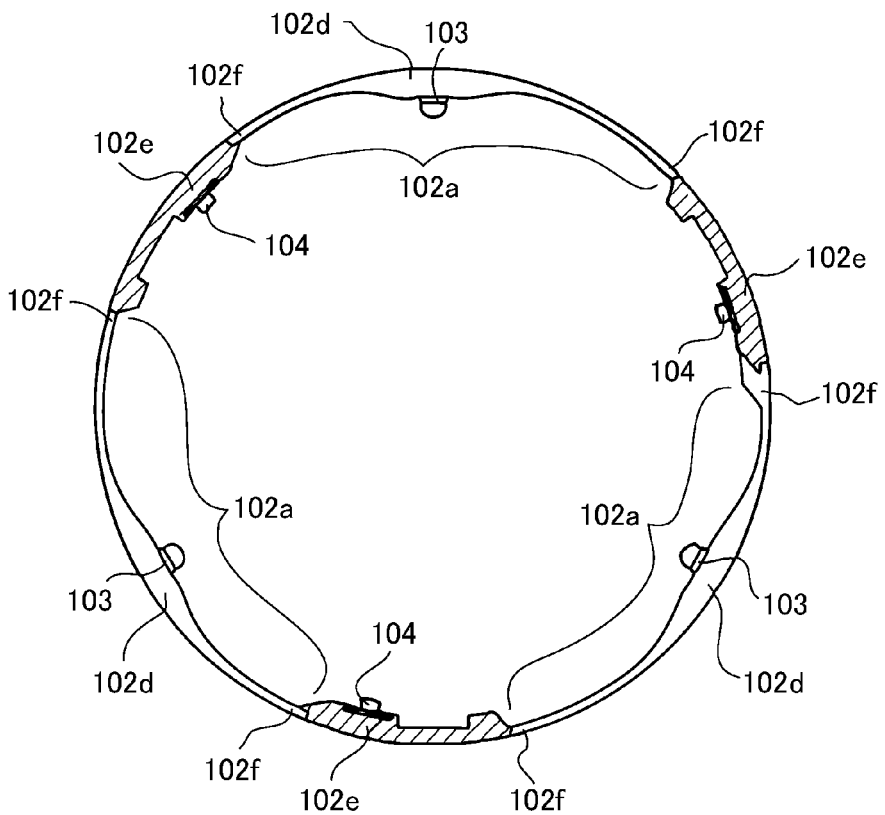
FIG. 3 is a cross-sectional view of a first unit cylinder in the present embodiment.
Figure 4A:
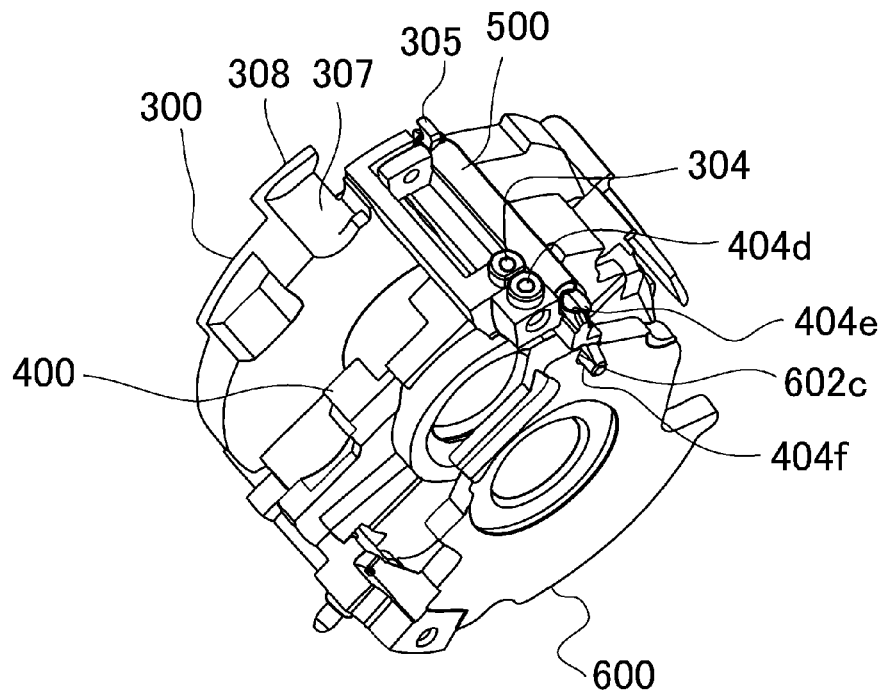
FIG. 4A is a perspective view illustrating an integration unit that is configured by stacking a stop and shutter unit, a third unit, and a fourth unit in the present embodiment.
Figure 4B:
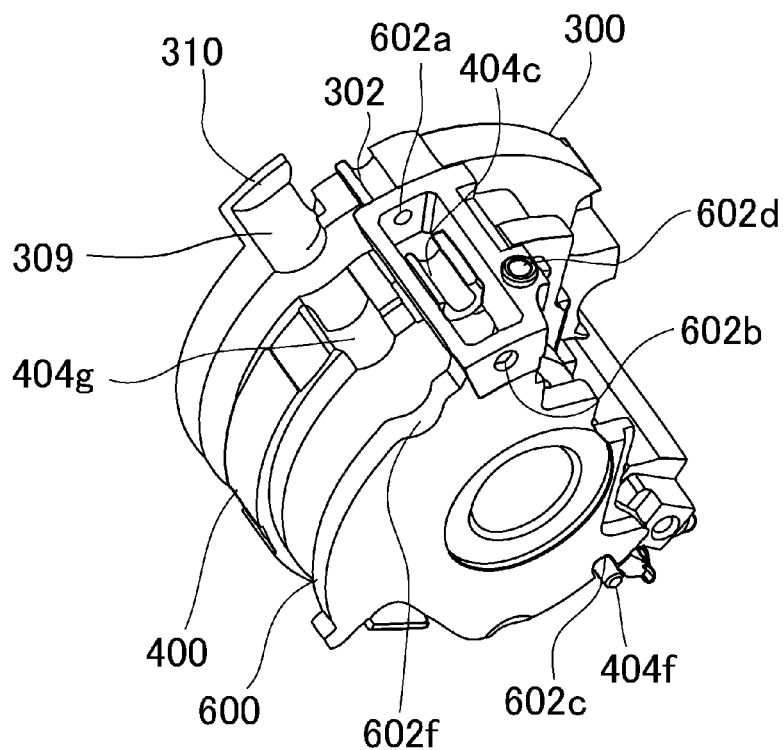
FIG. 4B is a perspective view illustrating an integration unit that is configured by stacking a stop and shutter unit, a third unit, and a fourth unit in the present embodiment.
Figure 5:
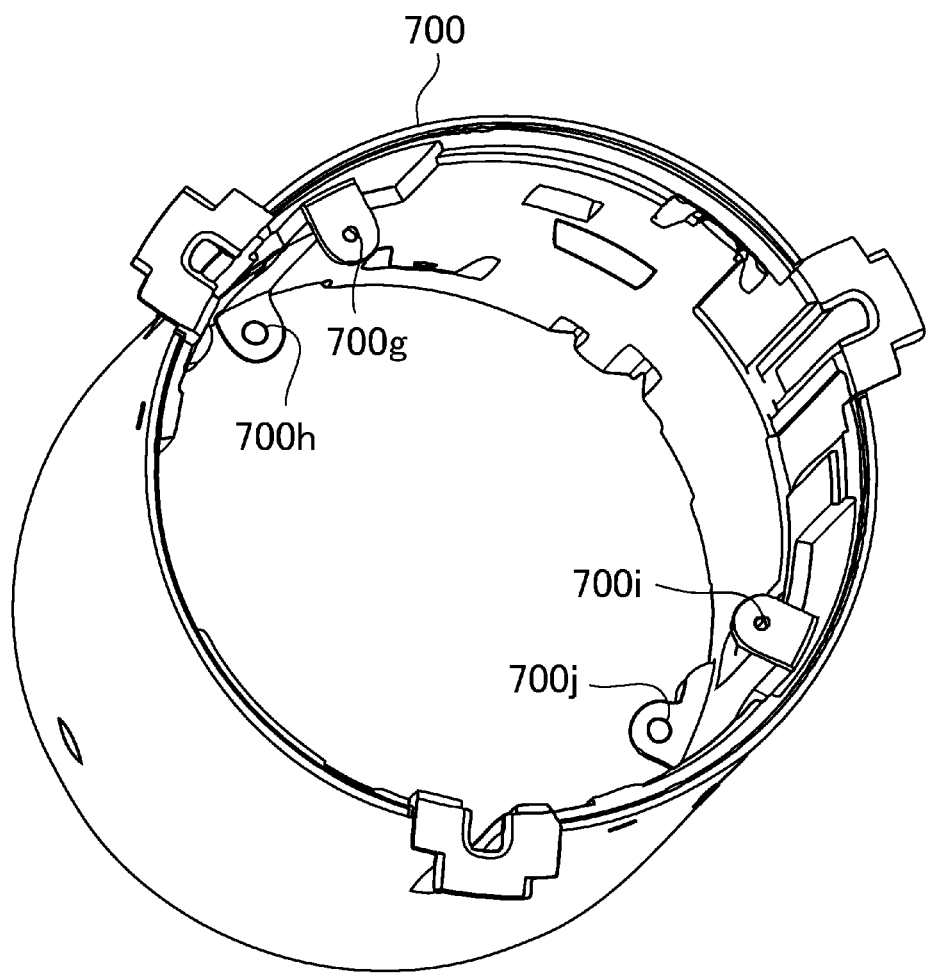
FIG. 5 is a perspective view illustrating a linear cylinder in the present embodiment.
Figure 6A:
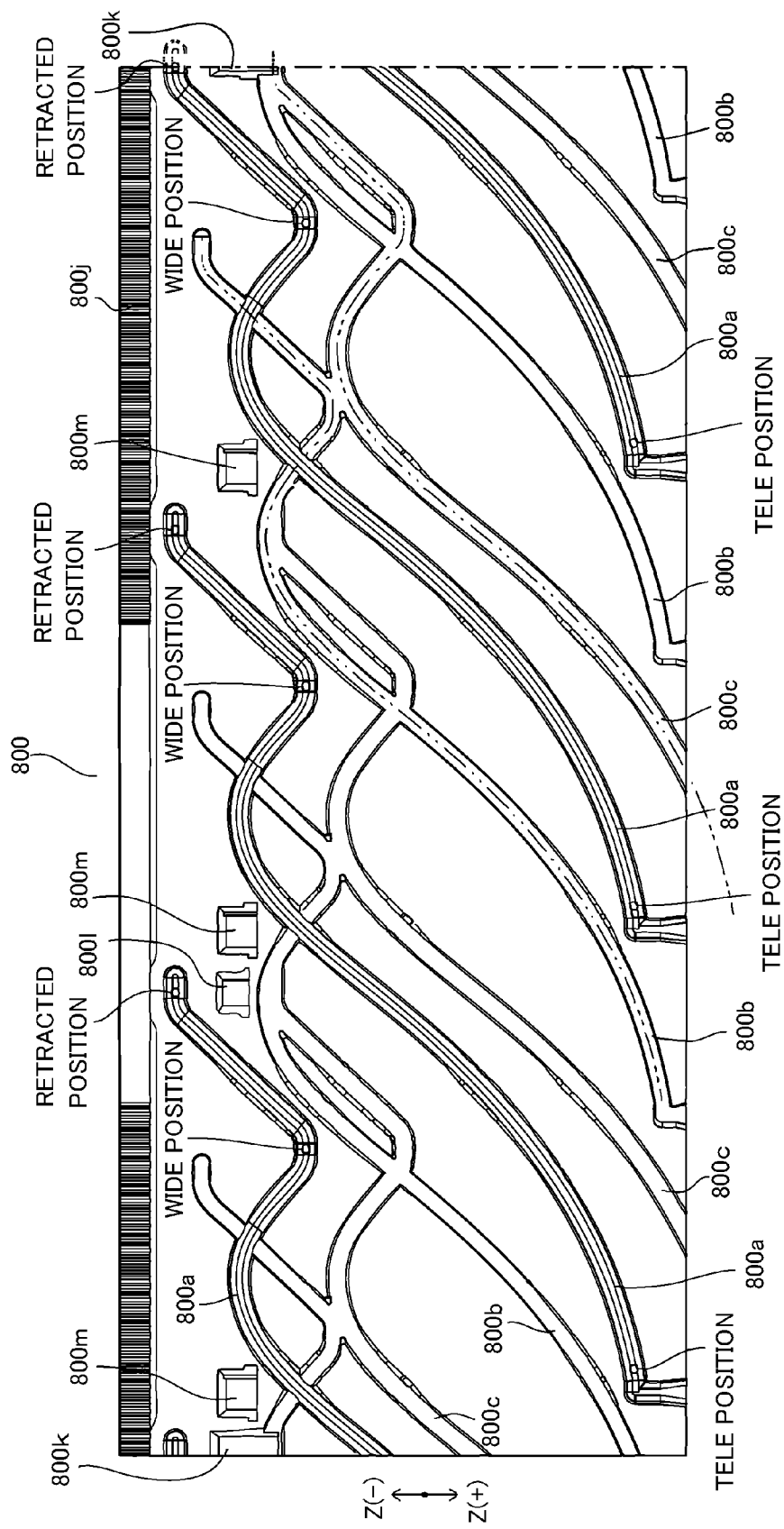
FIG. 6A is a development view of an outer surface of a cam cylinder in the present embodiment.
Figure 6B:
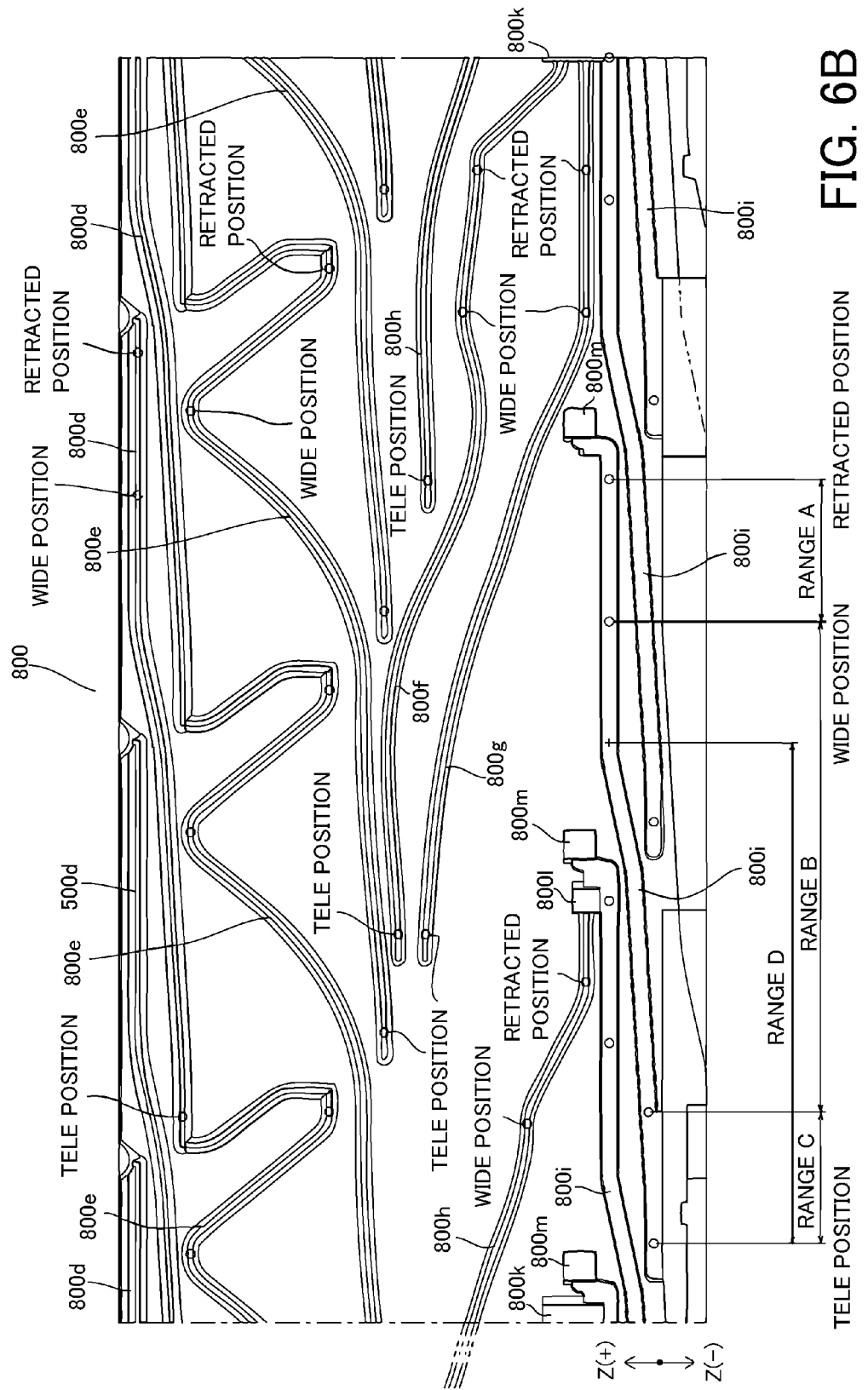
FIG. 6B is a development view of an inner surface of the cam cylinder in the present embodiment.
Figure 7:
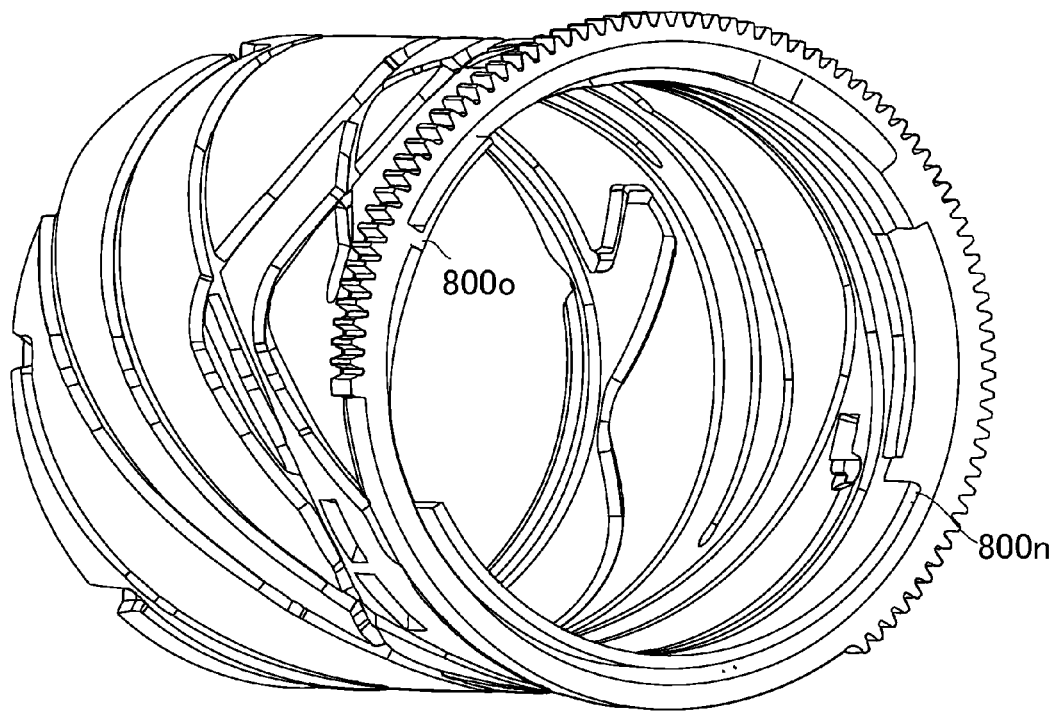
FIG. 7 is a perspective view illustrating the cam cylinder in the present embodiment.

First of all, a configuration of a zoom lens barrel in the present embodiment will be described. FIG. 1 is an exploded perspective view illustrating a whole of the zoom lens barrel. FIG. 2 is a perspective view illustrating a first unit. FIG. 3 is a cross-sectional view of a first unit cylinder. FIGS. 4A and 4B are perspective views illustrating an integration unit that is configured by stacking a stop and shutter unit, a third unit, and a fourth unit. FIG. 5 is a perspective view illustrating a linear cylinder. FIGS. 6A and 6B are development views of an outer surface of a cam cylinder (FIG. 6A) and an inner surface of the cam cylinder (FIG. 6B). FIG. 7 is a perspective view illustrating the cam cylinder.

In FIGS. 1 and 2, reference numeral 100 denotes a first unit. Reference numeral 101 denotes a first lens unit, and reference numeral 102 denotes a first unit cylinder (a lens holding frame) that holds the first lens unit 101. The first unit cylinder 102 is provided with slit holes 102a at three regions in a circumferential direction, a convex portion 102b on an inner circumferential surface, and groove portions 102c at three regions in the circumferential direction. Reference numeral 103 denotes cam pins, each of which has a cam pin engagement portion 103a and a taper-shaped portion 103b and is fixed at the three regions in the circumferential direction of the first unit cylinder 102. Reference numeral 104 denotes pin members, which are fixed at the three regions in the circumferential direction of the first unit cylinder 102.

In FIG. 1, reference numeral 200 denotes a second unit. Reference numeral 201 denotes a second lens unit, and reference numeral 202 denotes a second unit cylinder. The second unit cylinder 202 is provided with cam pins 203 at three regions in the circumferential direction. The cam pin 203 has a taper portion 203a and a cylinder portion 203b.

FIG. 3 is a cross-sectional view obtained by cutting the first unit cylinder 102 at the slit hole 102a when viewed from a side of the lens 101. The slit holes 102a are disposed at three regions on the first unit cylinder 102 at intervals of 120 degrees. The cam pin holding portion 102d is fleshy to maintain the strength around the cam pin 103. The cam pin holding portion 102d is fleshy so as to suppress deformation or damage when an impact occurs.

A part from the cam pin holding portion 102d to a slit end portion 102f is connected with a smooth curved line and is configured so that a stress is not locally concentrated when an impact occurs. Six smooth lines from the cam pin holding portion 102d to the slit end portion 102f are substantially the same curved lines each other. The cam pin holding portion 102d has a thin wall towards the close of both of the end portions of the slit hole 102a so as to ensure an appropriate elastic force. A pin member 104 that engages with a cam groove 800b described below is held by a pin member holding portion 102e between the slit holes 102a at the three regions of the first unit cylinder 102.

In FIGS. 1, 4A, and 4B, reference numeral 300 denotes a stop and shutter unit. The stop and shutter unit 300 is provided with a main guide portion 301, and main guide holes 301a and 301b are formed on the main guide portion 301. The stop and shutter unit 300 is also provided with a sub-guide portion 302, a cam pin 303, a hole portion 304 into which the cam pin 303 is able to be fitted, and a hook portion 305. Furthermore, the stop and shutter unit 300 is provided with a shaft portion 306, notch portions 307 and 309, and convex-shaped portions 308 and 310.

Reference numeral 400 denotes a third unit. Reference numeral 401 denotes a third lens unit, reference numeral 402 denotes a third lens unit holding member, and reference numeral 403 denotes a well-known drive unit that drives the third lens unit holding member 402 in a direction orthogonal to an optical axis. Reference numeral 404 denotes a third unit base member that holds the third lens unit holding member 402 and the drive unit 403. The third unit base member 404 is provided with main guide holes 404a and 404b, a sub-guide portion 404c, and a cam pin insertion hole 404d. The third unit base member 404 is also provided with a hook portion 404e, a guide portion 404f, and a notch portion 404g. Reference numeral 405 denotes a cam pin, which is inserted into the cam pin insertion portion 404d. Reference numeral 500 denotes a spring member, which hooks on the hook portion 305 of the stop and shutter unit 300 and the hook portion 404e of the third unit 400.

Reference numeral 600 denotes a fourth unit. Reference numeral 601 denotes a fourth lens unit, and reference numeral 602 denotes a fourth lens unit holding member, which holds the fourth lens unit 601. The fourth lens unit holding member 602 is provided with main guide holes 602a and 602b, a sub-guide portion 602c that engages with the guide portion 404f, and a cam pin insertion hole 602d. The fourth lens unit holding member 602 is also provided with a positioning hole 602e and a notch portion 602f. Reference numeral 603 denotes a cam pin, which is inserted into the cam pin insertion hole 602d.

In FIGS. 1 and 5, reference numeral 700 denotes a linear cylinder. The linear cylinder 700 is fixed on a base member 1001 described below. The linear cylinder 700 is provided with convex portions 700a that engage with the groove portions 102c of the first cylinder 102 and groove portions 700b that engage with the cylinder portions 203b of the second cylinder 202 at three regions, respectively. The linear cylinder 700 is also provided with concave portions 700c at three regions in the circumferential direction and a notch 700d at one region. Similarly, the linear cylinder 700 is provided with hole portions 700e at three regions in the circumferential direction and a notch 700f at one region. Furthermore, it is provided with guide shaft holding portions (700g, 700h), (700i, 700j) each of which has a through hole. Additionally, a hole portion 700k into which the cam pins 303 and 405 are inserted and a hole portion 700l into which the cam pin 603 is inserted are formed on it.

Reference numeral 701 denotes a ball member (a first cam follower) that is provided on the linear cylinder 700, which is fitted into the concave portion 700c. The ball member 701 is configured so as to be rotatable with respect to a cam groove 800d described below. Reference numeral 702 denotes a pin member (a second cam follower) that is provided on the linear cylinder 700, which is fitted into the hole portions 700e at the three regions. The end of the pin member 702 has a spherical R-shape. The pin member 702 is configured so as to be elastically engageable with a cam groove 800i described below in a radial direction of a cam cylinder 800.

Reference numeral 703 denotes a guide shaft member, which is fitted into the main guide holes 301a and 301b of the stop and shutter unit 300 and the main guide holes 404a and 404b of the third unit base member 404, and is held by the guide shaft holding portions 700g and 700h. Reference numeral 704 denotes a guide shaft member, which is fitted into the sub-guide portion 302 of the stop and shutter unit 300, the sub-guide portion 404c of the third unit base member 404, and the main guide holes 602a and 602b of the fourth lens unit holding member 602, and it is held by the guide shaft holding portions 700i and 700j.

In FIGS. 1, 6A, and 6B, reference numeral 800 denotes a cam cylinder. The cam cylinder 800 is configured so as to be rotatable with respect to the linear cylinder 700. At an outer circumference side of the cam cylinder 800, a cam groove 800a that the cam pin engagement portion 103a of the cam pin 103 contacts, a cam groove 800b that corresponds to the pin member 104, and a cam groove 800c that corresponds to the convex portion 102b are formed. The pin member 104 does not contact the cam groove 800b at the time of a normal driving. The pin member 104 contacts the cam groove 800b only when the first unit cylinder 102 has an impact. The pin member holding portion 102e is configured to be fleshy to maintain the strength. The cam cylinder 800 rotates to drive the cam pin 103 to linearly drive the first unit cylinder 102 without a backlash in the optical axis direction. The cam grooves 800a, 800b, and 800c have the same trajectory, and predetermined gaps are provided between the pin member 104 and the cam groove 800b and between the convex portion 102b and the cam groove 800c.

On an inner circumference side surface of the cam cylinder 800, cam groove 800d (a first cam portion) that the ball members 701 are able to contact are formed at three regions in the circumferential direction. The ball member 701 contacts the cam groove 800d to determine a position in the optical axis direction of the cam cylinder 800 with respect to the linear cylinder 700. Cam grooves 800e that the cam pins 203 are able to contact are formed on the cam cylinder 800 at three regions in the circumferential direction. Similarly, a cam groove 800f that the cam pin 303 is able to contact, a cam groove 800g that the cam pin 405 is able to contact, and a cam groove 800h that the cam pin 603 is able to contact are formed on the cam cylinder 800. Furthermore, a cam groove 800i (a second cam portion) that has the same trajectory as the cam groove 800d corresponding to the pin member 702 is formed on the cam cylinder 800, and the end spherical R-shape of the pin member 702 contacts a cam lower surface of the cam groove 800i. The pin member 702 engages with the cam groove 800i in the radial direction of the cam cylinder 800, which contacts it in two directions different from each other that is the optical axis direction. While the cam groove 800d is provided at one end side in the optical axis direction of the cam cylinder 800, the cam groove 800i is provided at the other end side in the optical axis direction of the cam cylinder 800.

At the outer circumference side of the came cylinder 800, a gear portion 800j is provided. Furthermore, a hole portion 800k into which the cam pins 303 and 405 are fitted and a hole portion 800l into which the cam pin 603 are fitted are provided. Additionally, hole portions 800m into which the pin members 702 are fitted are provided at three regions in the circumferential direction. The cam cylinder 800 is, as illustrated in FIG. 7, provided with lower surface portions 800n and 800o that receive an external pressure described below.

In FIG. 1, reference numeral 900 denotes a fifth unit. Reference numeral 901 denotes a fifth lens unit, and reference numeral 902 denotes a holding member that holds the fifth lens unit 901. Main guide holes 902a and 902b and a sub-guide portion 902c are formed on the fifth lens unit 902. Reference numeral 903 denotes a guide shaft member, which is fitted into the main guide holes 902a and 902b of the fifth lens unit 902. Reference numeral 904 denotes a guide shaft member, which is fitted into a sub-guide portion 902c of the fifth lens unit 902. The first unit 100, the second unit 200, the stop and shutter unit 300, the third unit 400, the fourth unit 600, and the fifth unit 900 described above constitute a plurality of optical component units.

Reference numeral 1000 denotes a base unit. Reference numeral 1001 denotes a base member, which is provided with hole portions 1001a and 1001b that hold the guide shaft members 903 and 904 respectively. Rib portions 1001c and 1001d that have the same trajectories as the cam grooves 800d and 800i are provided at positions differently in a radial direction. The rib portion 1001c (the internal diameter side) and the rib portion 1001d (the outside diameter side) are configured to be able to face the lower surface portions 800n and 800o at predetermined intervals, respectively. The rib portions 1001c and 1001d are a third cam portion that contacts the cam cylinder 800 in the optical axis direction. Reference numeral 1002 denotes a gear member, which is rotatably driven by a drive source (not shown). Reference numeral 1003 denotes a CCD, which is attached to the base member 1001.

Next, a procedure of assembling the zoom lens barrel (a barrel unit) having the configuration described above will be described. First of all, the stop and shutter unit 300, the third unit 400, and the fourth unit 600 are stacked to constitute the integration unit, which is integrated into the linear cylinder 700. The integration unit is in a state where the spring member 500 is hooked on the hook portion 305 of the stop and shutter unit 300 and the hook portion 404e of the third unit 400 (a state illustrated in FIGS. 4A and 4B). In this case, the shaft portion 306 is fitted into the positioning hole 602e so that the state of the integration unit is easily maintained.

Figure 8A:
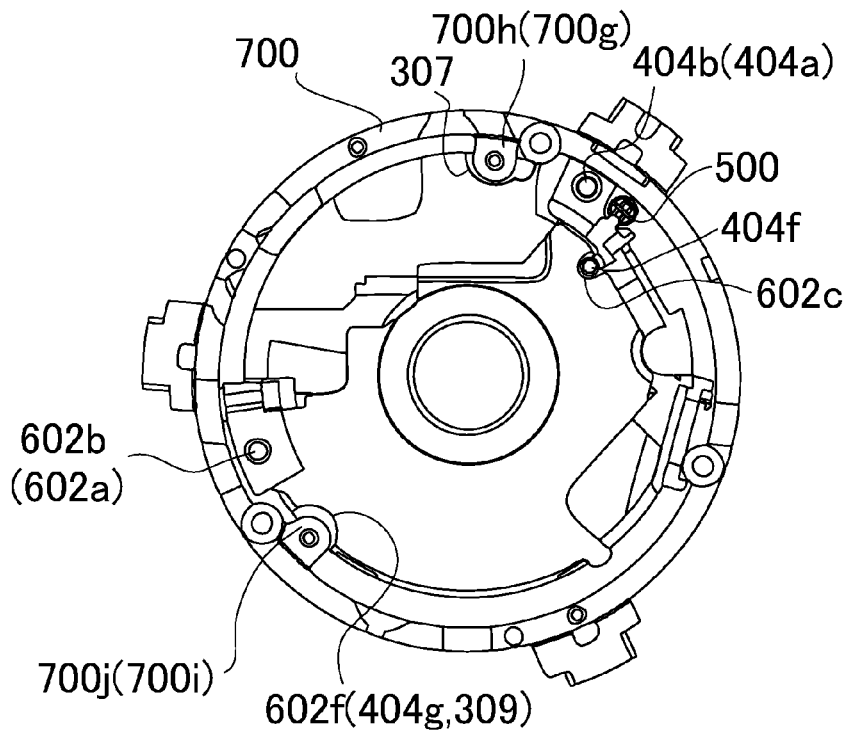
FIG. 8A is a view illustrating a procedure of incorporating the integration unit into the linear cylinder in the present embodiment.
Figure 8B:
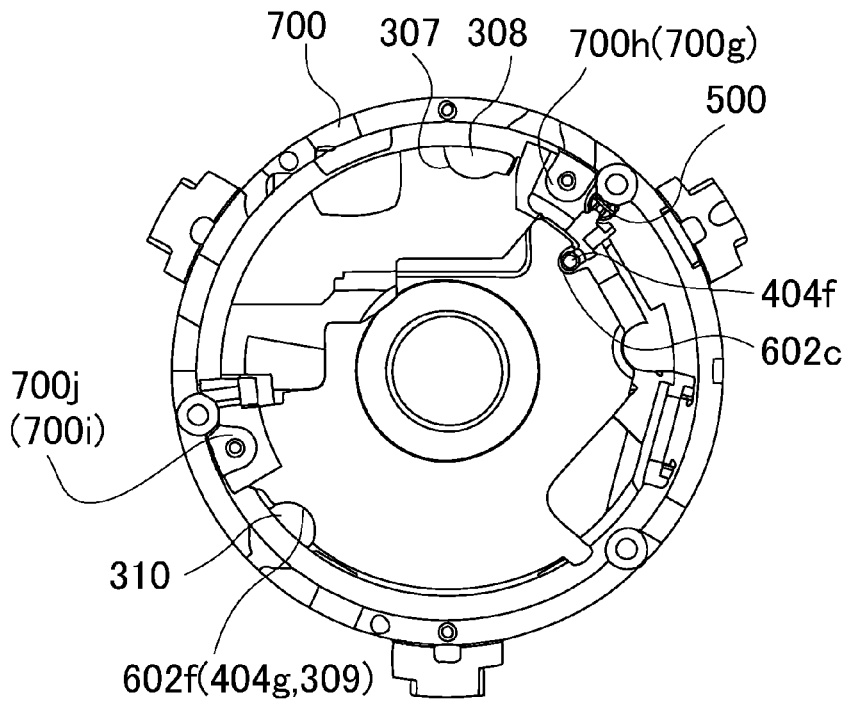
FIG. 8B is a view illustrating a procedure of incorporating the integration unit into the linear cylinder in the present embodiment.

FIGS. 8A and 8B are diagrams illustrating a procedure of incorporating the integration unit into the linear cylinder 700. When the integration unit is incorporated into the linear cylinder 700, the notch portion 307 is aligned with the guide shaft holding portions (700g and 700h). Subsequently, the integration is performed at a phase where the notch portions 309, 404g, and 602f are aligned with the guide shaft holding portions (700i and 700j) (FIG. 8A). Then, the linear cylinder 700 is incorporated until a position where the guide shaft holding portions 700g and 700i are adjacent to the convex-shaped portions 308 and 310 in the optical axis direction. Furthermore, the integration unit (a unit that is configured by stacking the stop and shutter unit 300, the third unit 400, and the fourth unit 600) is rotated relative to the linear cylinder 700. In this case, the guide shaft holding portions 700g and 700h, the main guide holes 301a and 301b, and the main guide holes 404a and 404b coincide with each other. At the same time, the guide shaft holding portions 700i and 700j, the sub-guide portion 302, the sub-guide portion 404c, and the main guide holes 602a and 602b also coincide with each other (FIG. 8B). In this state, the guide shaft members 703 and 704 are incorporated from the side of the guide shaft holding members 700h and 700j.

Figure 9A:
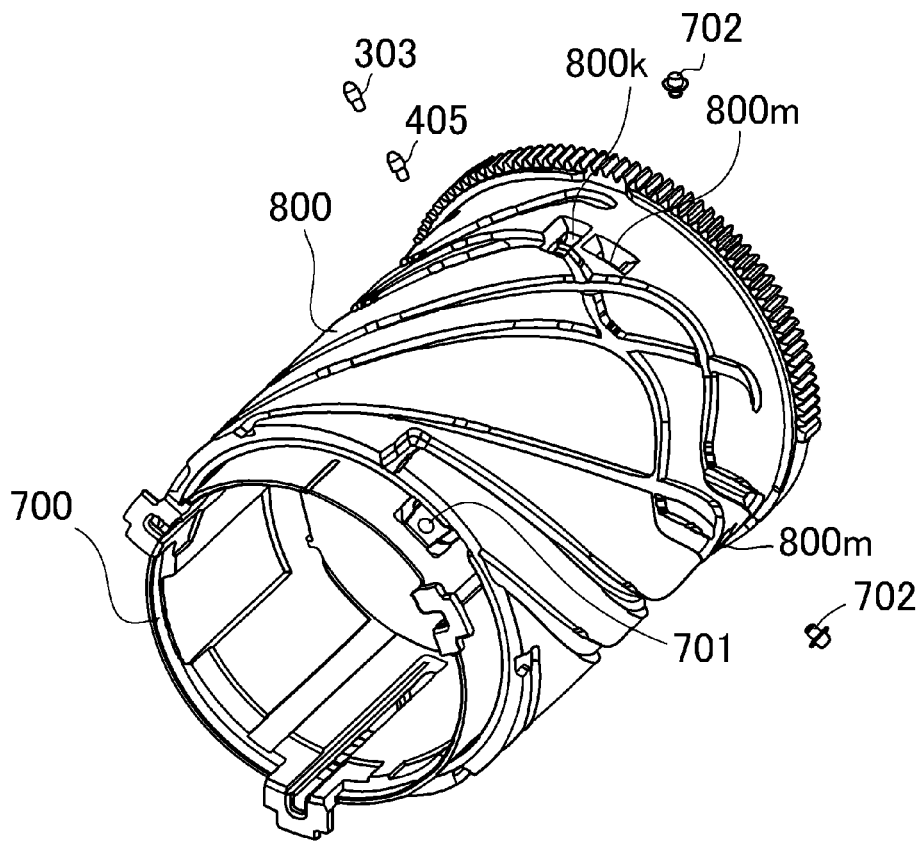
FIG. 9A is a perspective view illustrating a procedure of assembling the zoom lens barrel in the present embodiment.
Figure 9B:
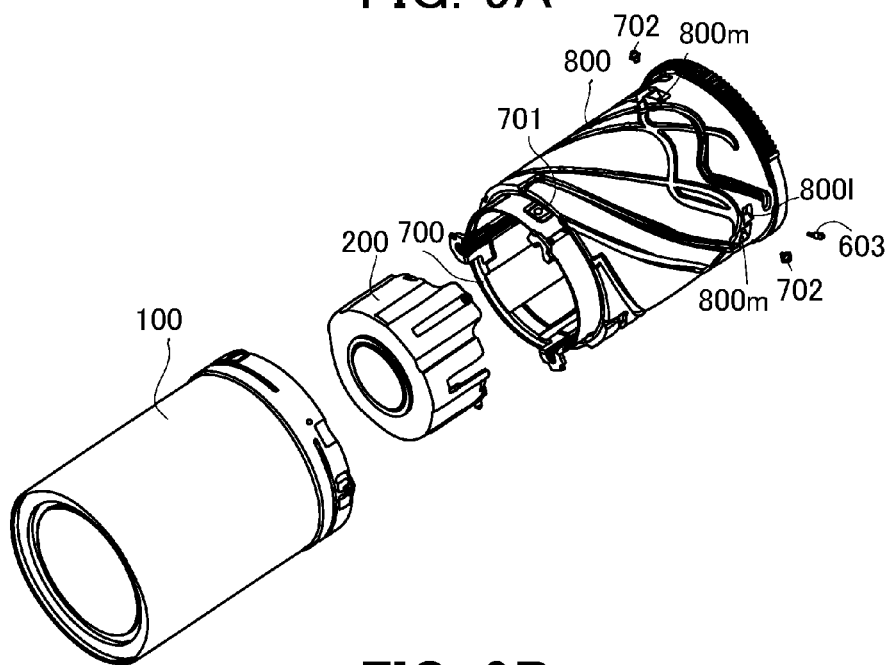
FIG. 9B is a perspective view illustrating a procedure of assembling the zoom lens barrel in the present embodiment.

FIGS. 9A and 9B are perspective views illustrating a procedure of assembling the zoom lens barrel. As illustrated in FIG. 9A, the linear cylinder 700 is fitted into the cam cylinder 800, and the cam pin 303 of the stop and shutter unit 300 is fitted into the hole portion 304 through hole portions 700k and 800k. Similarly, the cam pin 405 of the third unit 400 is fitted into the cam pin insertion hole 404d through the integration hole portions 700k and 800k. Furthermore, as illustrated in FIG. 9B, the cam pin 603 of the fourth unit 600 is fitted into the cam pin insertion hole 602d of the fourth lens unit holding member 602 through integration holes 700l and 800l. Subsequently, the cam pin 203 of the second unit 200 is incorporated so as to be aligned with an end of the cam groove 800d of the cam cylinder 800. Then, the pin member 702 is fitted into the hole portion 700e at a phase where the hole portion 800*m* coincides with the hole portion 700*e*, and at the same time the ball member 701 is fitted into the hole portion 700*c*. In this state, the cam cylinder 800 is integrated, and finally the first unit 100 is integrated. The integration described above is performed while the cam cylinder 800 is rotated at a predetermined phase.

Figure 10A:
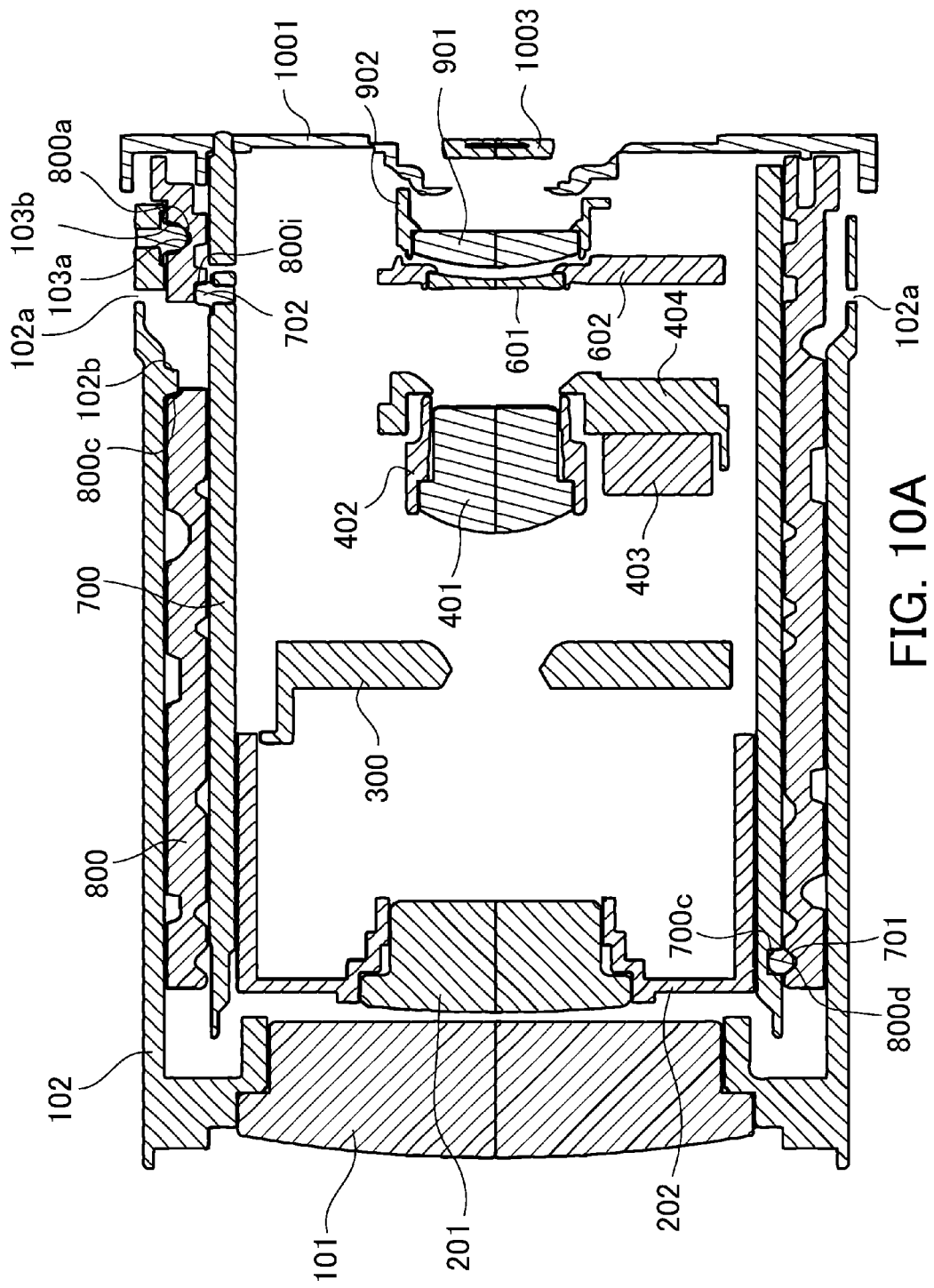
FIG. 10A is a cross-sectional view of the zoom lens barrel at a retracted position in the present embodiment.
Figure 10B:
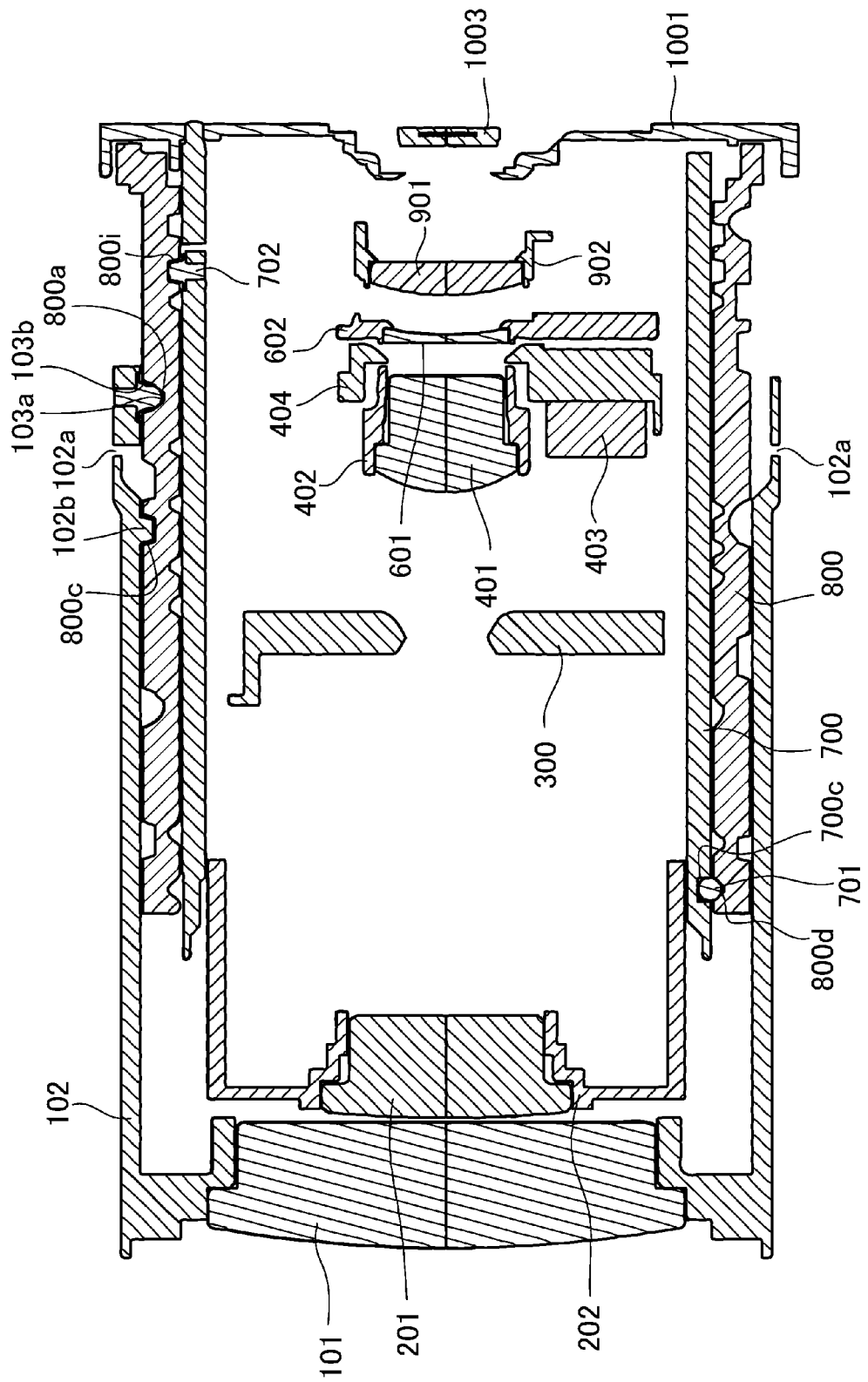
FIG. 10B is a cross-sectional view of the zoom lens barrel at a WIDE position in the present embodiment.
Figure 10C:
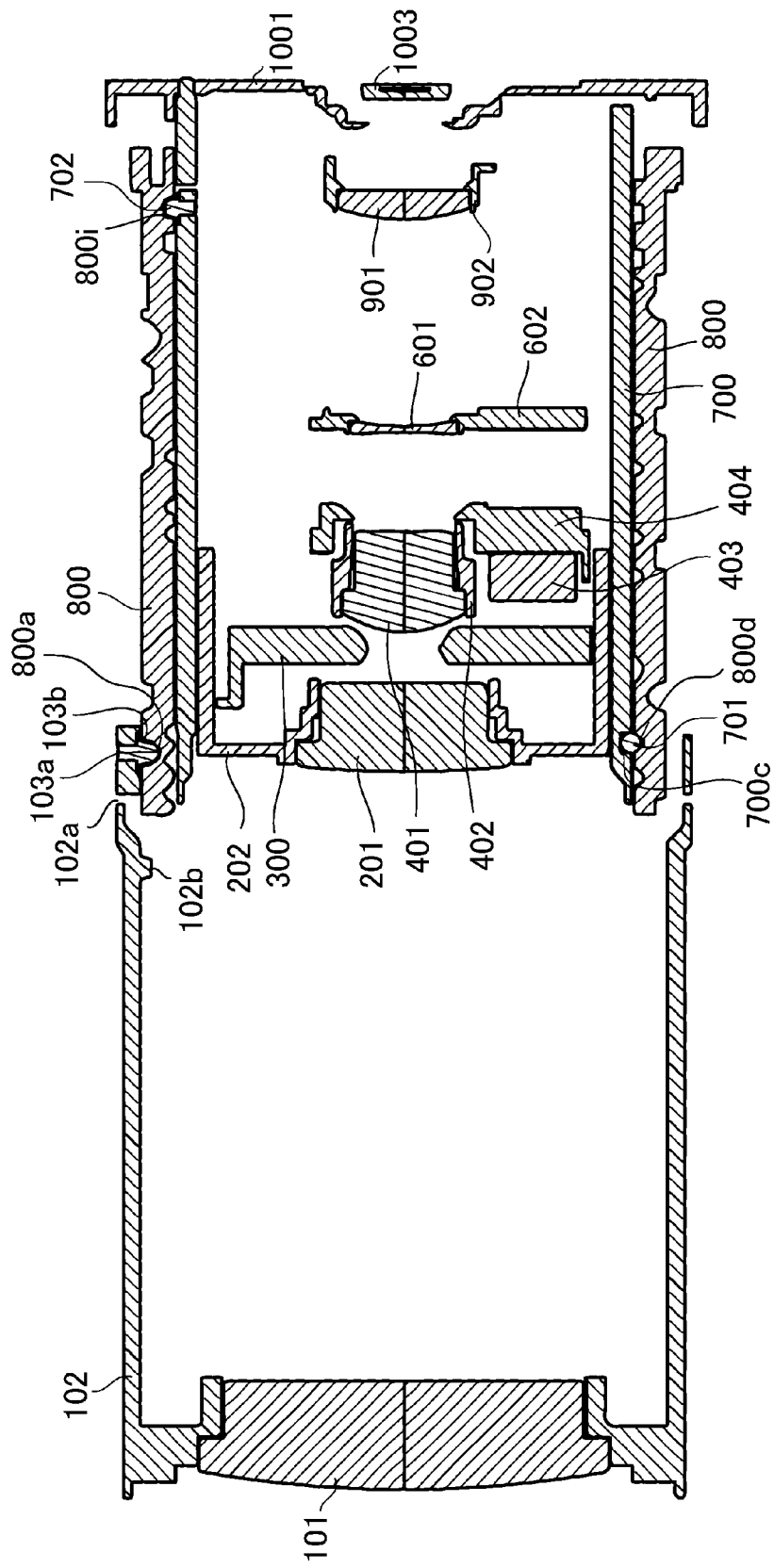
FIG. 10C is a cross-sectional view of the zoom lens barrel at a TELE position in the present embodiment.
Figure 11A:
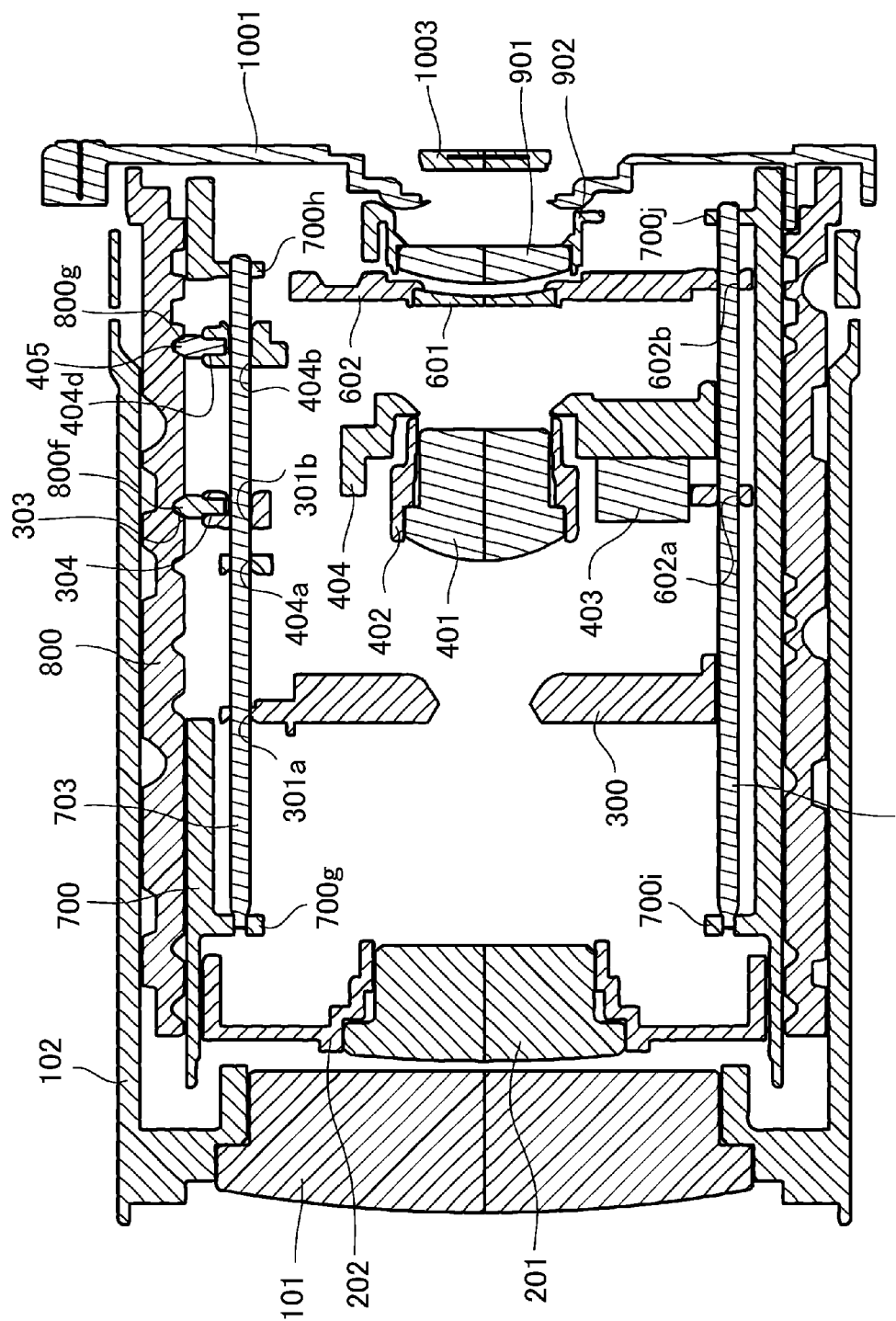
FIG. 11A is a cross-sectional view of the zoom lens barrel at the retracted position in the present embodiment.
Figure 11B:
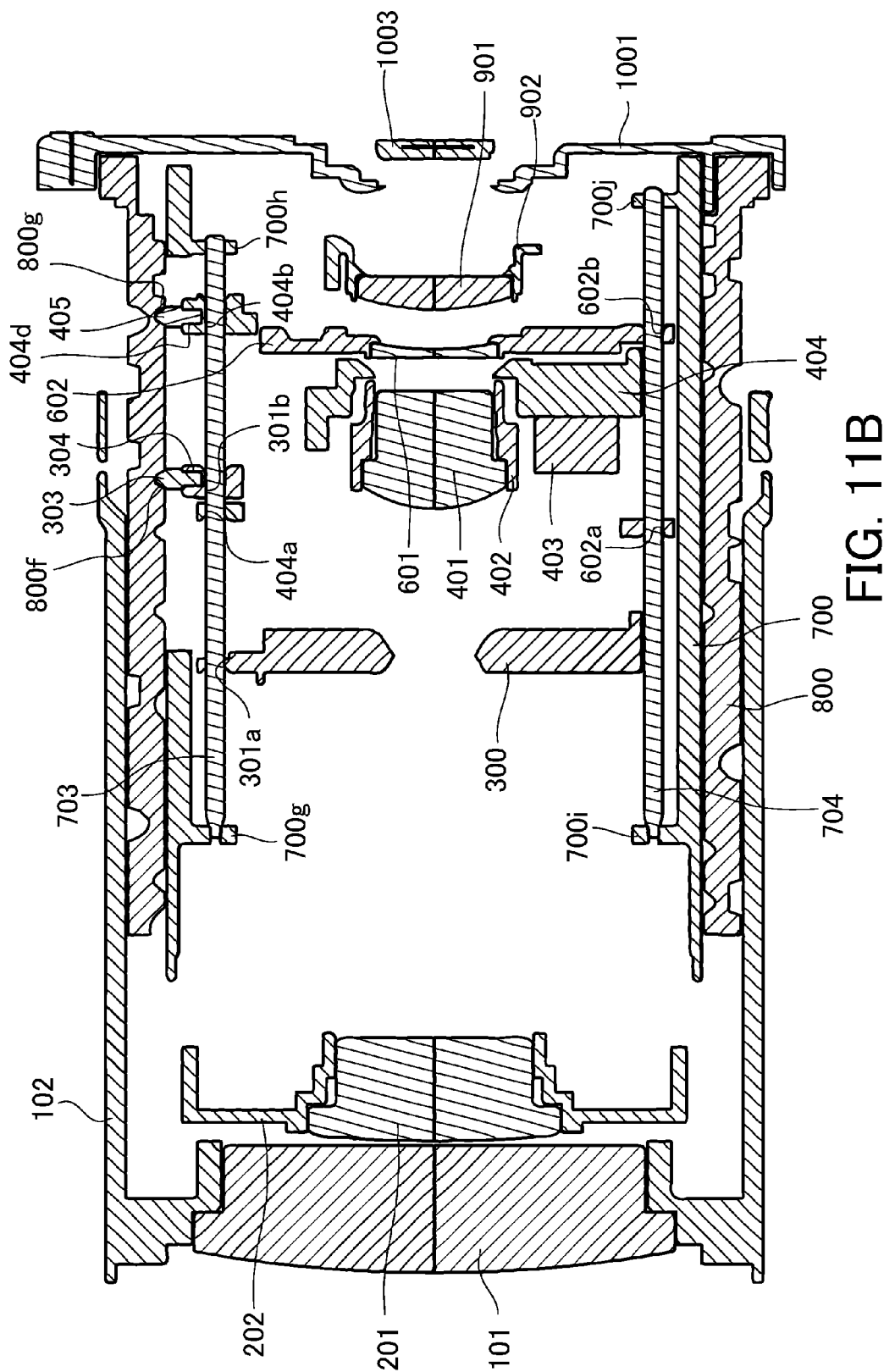
FIG. 11B is a cross-sectional view of the zoom lens barrel at the WIDE position in the present embodiment.
Figure 11C:
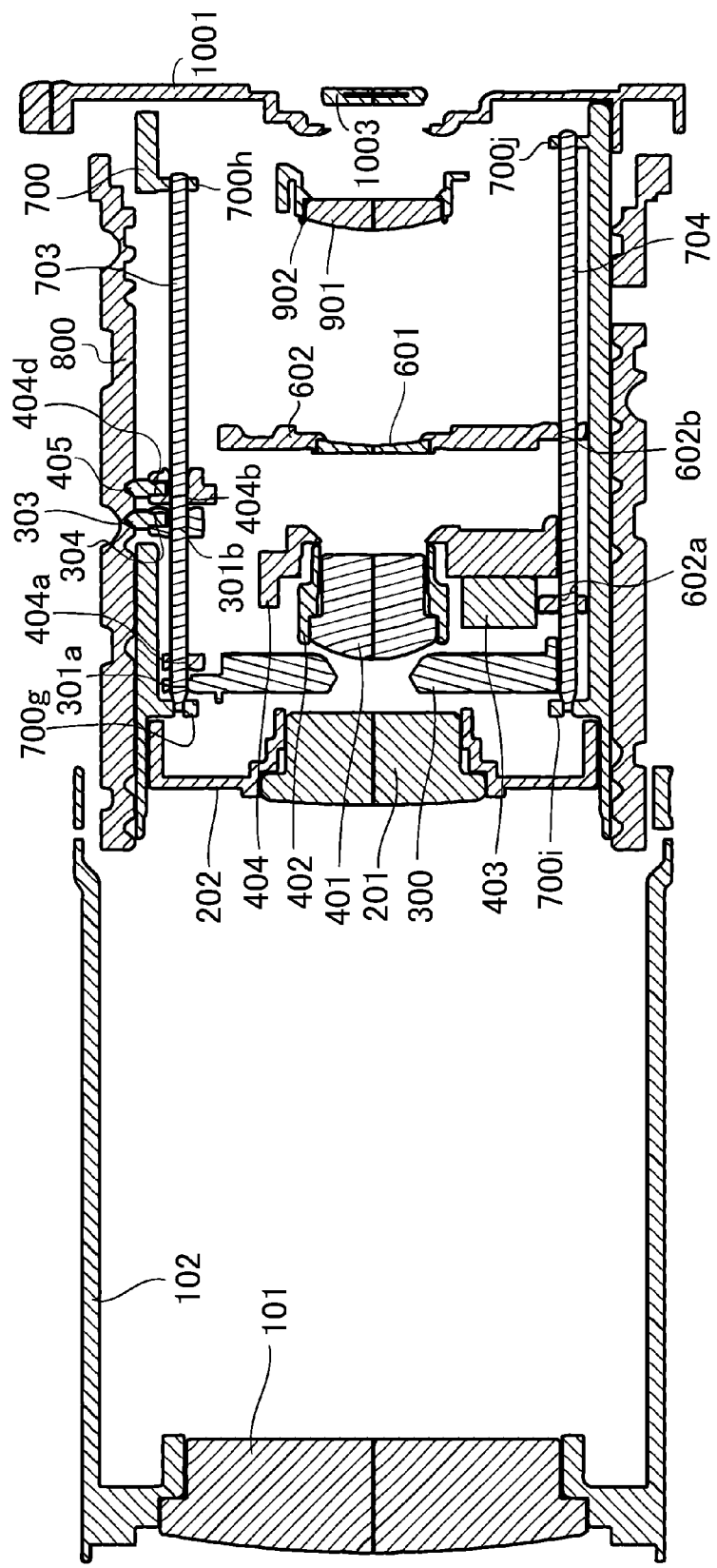
FIG. 11C is a cross-sectional view of the zoom lens barrel at the TELE position in the present embodiment.

Next, referring to FIGS. 10A to 10C and 11A to 11C, a zoom operation in the present embodiment will be described. FIGS. 10A to 10C and 11A to 11C are cross-sectional views of the zoom lens barrel in the present embodiment, which illustrate cut surfaces different from each other. FIGS. 10A and 11A are cross-sectional views at a retracted position (a), FIGS. 10B and 11B are cross-sectional views at a WIDE position, and FIGS. 10C and 11C are cross-sectional views at a TELE position (c). When the gear member 1002 is rotated by a drive source (not shown), the rotation force is transmitted to the gear portion 800*j* to rotate the cam cylinder 800. Since the ball member 701 fitted into the linear cylinder 700 contacts the cam groove 800*d*, the cam cylinder 800 rotates along the cam trajectory of the cam groove 800*d* around the optical axis direction. One ball member 701 is configured to be movable by the notch portion 700*d* in an outer circumferential direction, which always contacts the cam groove 800*d*.

Figure 12:
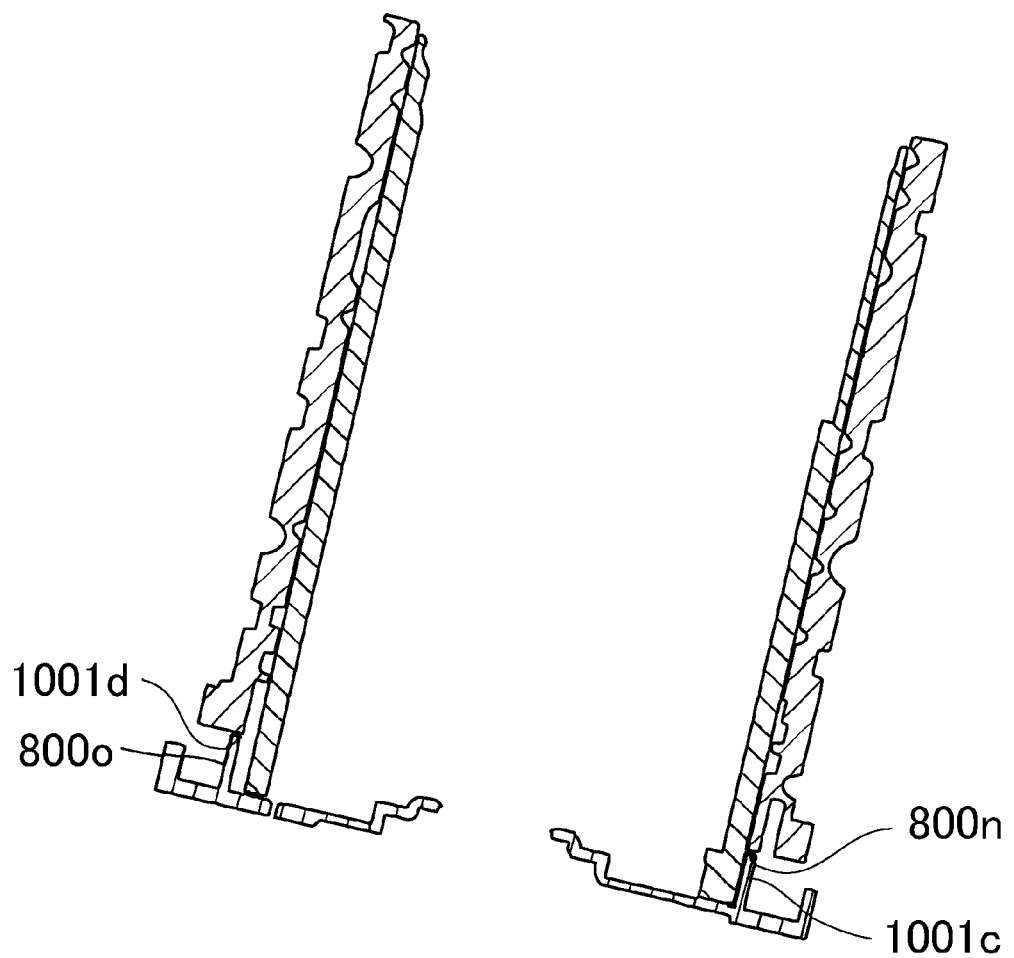
FIG. 12 is a cross-sectional view illustrating a relationship between the cam cylinder and a base member in the present embodiment.

In this case, the pin members 702 are in a state where two of the pin members 702 are engageable with the cam groove 800*i* in both directions of the optical axis direction and the other one is engageable with the cam groove 800*i* only in a Z (−) direction in a range A illustrated in the inner circumferential development view of FIG. 6B. The three pin members 702 are in a state of being engageable with the cam groove 800*i* in both the directions of the optical axis direction in a range B. The three pin members 702 are in a state of being engageable with the cam groove 800*i* only in a Z (+) direction in a range C. As illustrated in FIG. 12, the rib portions 1001*c* and 1001*d* of the base member 1001 and the lower surface portions 800*n* and 800*o* of the cam cylinder 800 are external pressure receivers in the Z (−) direction in a range D.

The convex portion 700*a* of the linear cylinder 700 is an external pressure receiver in the Z (+) direction. The end spherical R-shape of the pin member 702 contacts the lower portion of the cam groove 800*i* in a whole range. One ball member 701 and the pin members 702 are configured to be movable in the radial direction by the notch portions 700*d* and 700*f*. The cam pin engagement portion 103*a* of the cam pin 103 contacts the cam groove 800*a* and the first unit 100 is moved along the cam trajectory of the cam groove 800*a* in the optical axis direction by the rotation of the cam cylinder 800. In this case, the groove portion 102*c* of the first cylinder 102 and the convex portion 700*a* engage with each other and the first unit 100 linearly moves in the optical axis direction. The cam pin 203 contacts the cam groove 800*e* and the second unit 200 moves along the cam trajectory of the cam groove 800*e* in the optical axis direction. In this case, the cylinder portion 203*b* of the second unit cylinder 202 and the groove portion 700*b* engage with each other, and the second unit 200 linearly moves in the optical axis direction. The cam pin 303 contacts the cam groove 800*f* and the stop and shutter unit 300 moves along the cam trajectory of the cam groove 800*f* in the optical axis direction. In this case, the guide shaft member 703 is fitted into the main guide holes 301*a* and 301*b* of the stop and shutter unit 300 and the guide shaft member 704 is fitted into the sub-guide portion 302, and the stop and shutter unit 300 linearly moves in the optical axis direction.

The cam pin 405 contacts the cam groove 800*g* and the third unit 400 moves along the cam trajectory of the cam groove 800*g* in the optical axis direction. In this case, the main guide holes 404*a* and 404*b* of the third unit base member 404 are fitted into the guide shaft member 703 and the sub-guide portion 404*c* is fitted into the guide shaft member 704, and the third unit 400 linearly moves in the optical axis direction. The cam pin 603 contacts the cam groove 800*h* and the fourth unit 600 moves along the cam trajectory of the cam groove 800*h* in the optical axis direction. In this case, the guide shaft member 704 is fitted into the main guide holes 602*a* and 602*b* of the fourth lens unit holding member 602 and the guide portion 404*f* is fitted into the sub-guide portion 602*c*, and the fourth unit 600 linearly moves in the optical axis direction. The rotation of the fifth unit 900 is restricted by the guide shaft members 903 and 904, and the fifth unit 900 is driven by a drive source (not shown) to a predetermined position in the optical axis direction. As described above, the first unit 100, the second unit 200, the stop and shutter unit 300, the third unit 400, the fourth unit 600, and the fifth unit 900 move in the optical axis direction.

As described above, in the zoom lens barrel of the present embodiment, the cam groove 800*d* is formed at one end side of the cam cylinder 800, and the ball member 701 contacts the cam groove 800*d*. Furthermore, the cam groove 800*i* is formed at the other end side of the cam cylinder 800, and the end spherical R portion of the pin member 702 contacts the lower portion of the cam groove 800*i*. Therefore, the cam cylinder 800 contacts the linear cylinder 700 at a long distance in the optical axis direction to be able to reduce the backlash. Since the rotatable ball member 701 contacts the cam groove 800*d*, the load in the driving can be reduced. The ball member 701 and the cam groove 800*d*, and the pin member 702 and the cam groove 800*i* elastically contact by the notch portions 700*d* and 700*f*, respectively, and the backlash of the cam cylinder 800 with respect to the linear cylinder 700 can be reduced. The rib portions 1001*c* and 1001*d* are provided on the base member 1001 so as to be positioned differently from each other in the radial direction, and it is a receiver of the external pressure by the convex portion 700*a* of the linear cylinder 700.

Next, a case in which the first unit cylinder 102 has an impact will be described.

Figure 13A:
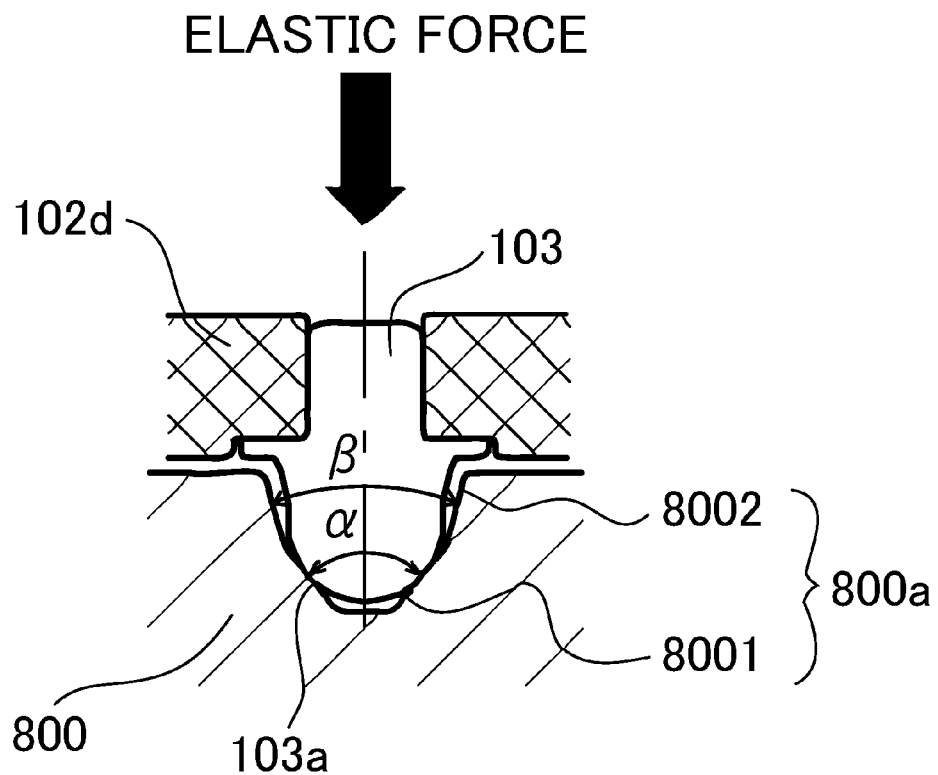
FIG. 13A is an enlarged view of a cam pin and its periphery in the present embodiment.
Figure 13B:
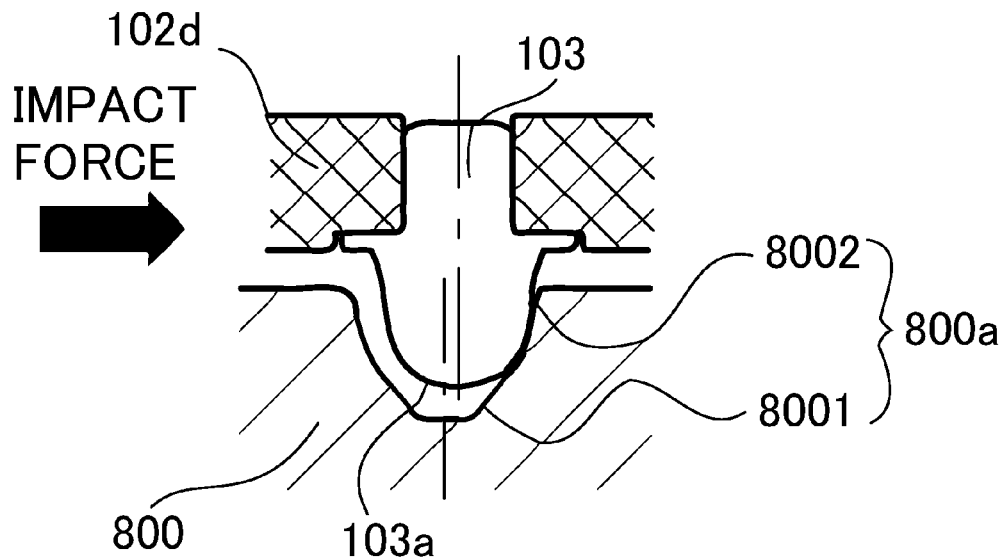
FIG. 13B is an enlarged view of a cam pin and its periphery in the present embodiment.

FIGS. 13A and 13B are enlarged views of the cam pin 103 and its periphery of the lens barrel in the present embodiment. FIG. 13A illustrates a state of the cam pin 103 when the first unit cylinder 102 does not have an impact, and FIG. 13B illustrates a state of the cam pin 103 when the first unit cylinder 102 has the impact.

As illustrated in FIG. 13A, when the first unit cylinder 102 does not have the impact, the cam pin 103 engages with the cam groove 800*a* of the cam cylinder 800. The cam pin engagement portion 103*a* of the cam pin 103 has a spherical shape. The spherical shape includes a shape (a substantive spherical shape) which is substantially recognized as a spherical shape, as well as an exact spherical shape.

In the cam cylinder 800, reference numeral 8001 denotes a basal side portion of the cam groove 800*a*, and reference numeral 8002 denotes an open side portion of the cam groove 800*a*. A taper angle $\alpha$ of the basal side portion 8001 of the cam groove 800*a* is designed so as to be greater than a taper angle $\beta$ of the open side portion 8002 of the cam groove 800*a* ($\alpha > \beta$). In other words, the cam groove 800*a* includes the basal side portion 8001 having the tape angle $\alpha$ (a first taper angle) and the open side portion 8002 having the taper angle $\beta$ (a second taper angle) smaller than the taper angle $\alpha$ ($\alpha > \beta$).

As illustrated in FIG. 13A, the cam pin engagement portion 103*a* only contacts the basal side portion 8001 of the cam groove 800*a* by the elastic force of the cam pin holding portion 102*d* (the elastic force indicated by an arrow) at the normal driving, i.e. when the first unit cylinder 102 does not have the impact. In other words, when the first unit cylinder 102 does not have the impact, the cam pin 103 contacts the basal side portion 8001 without contacting the open side portion 8002 of the cam groove 800a. On the other hand, as illustrated in FIG. 13B, when the first unit cylinder 102 has the impact (an impact force indicated by an arrow), the cam pin 103 falls down from the basal side portion 8001 to contact the open side portion 8002 while pushing up the cam pin holding portion 102d. In other words, when the first unit cylinder 102 has the impact, the cam pin 103 contacts the open side portion 8002 without contacting the basal side portion 8001 of the cam groove 800a.

As described above, the taper angle α of the basal side portion 8001 is greater than the taper angle β of the open side portion 8002 (α>β). The shape of the cam pin engagement portion 103a is a substantive spherical shape. Therefore, the cam pin 103 easily falls down from the basal side portion 8001 and does not easily have a dent. The impact force transmitted to the cam pin 103 is finally received by the open side portion 8002. Accordingly, the dent is easily formed on the open side portion 8002. In this case, since the cam pin 103 does not contact the open side portion 8002 at the time of the normal driving, the vibration caused by the dent is not transmitted to the first unit cylinder 102.

Figure 14:
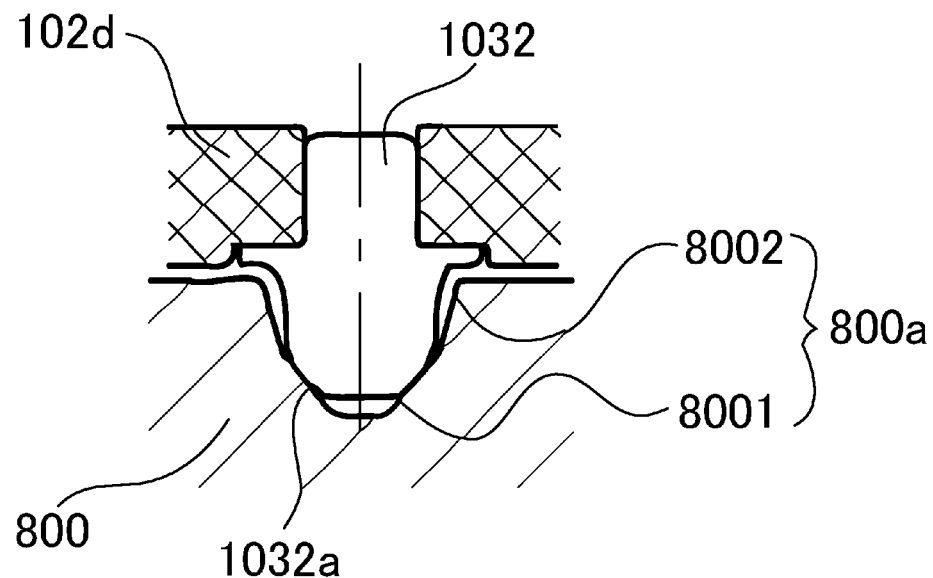
FIG. 14 is an enlarged view of a cam pin and its periphery in the present embodiment.

FIG. 14 is an enlarged view of a cam pin 1032 and its periphery having a structure different from those of FIGS. 13A and 13B. FIG. 14 illustrates a state of the cam pin 1032 when the first unit cylinder 102 does not have an impact. Reference numeral 1032a denotes a cam pin engagement portion in the present embodiment. The shape of the cam pin engagement portion 1032a is a substantive spherical shape, and an end portion of the cam pin 1032 is a flat surface. Similarly to the structure described above, the cam groove 800a includes the basal side portion 8001 having the taper angle α (the first taper angle) and the open side portion 8002 having the taper angle β (the second taper angle) smaller than the taper angle α (α>β).

Figure 15:
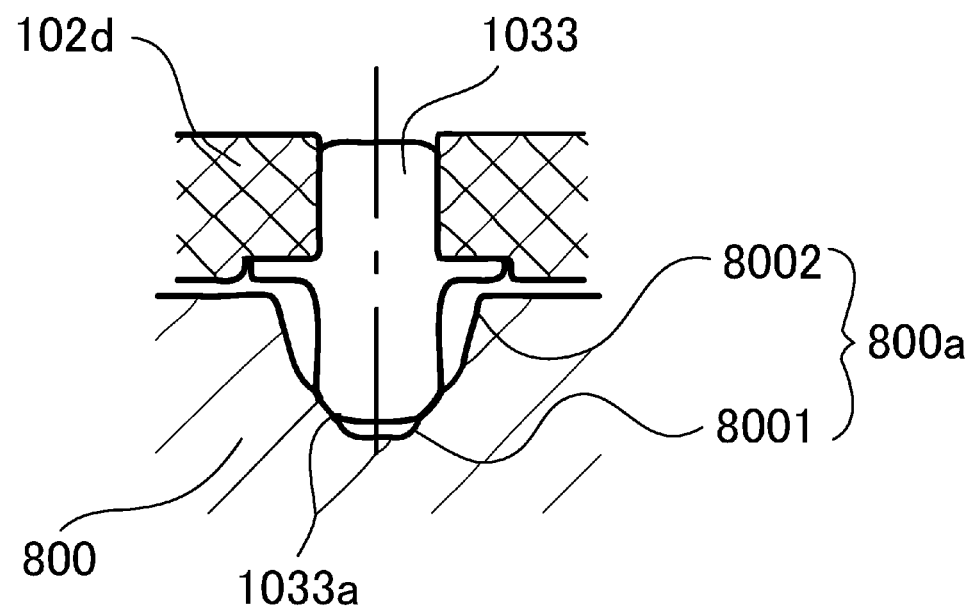
FIG. 15 is an enlarged view of a cam pin in the present embodiment.

FIG. 15 is an enlarged view of a cam pin 1033 and its periphery having a structure different from those of FIGS. 13A, 13B, and 14. FIG. 15 illustrates a state of the cam pin 1033 when the first unit cylinder 102 does not have the impact at the time of the normal driving. Reference numeral 1033a denotes a cam pin engagement portion in the present embodiment. The cam pin engagement portion 1033a has a round shape (R shape), and an end of the cam pin 1033 has a flat surface. Similarly to the structure described above, the cam groove 800a includes the basal side portion 8001 having the taper angle α (the first taper angle) and the open side portion 8002 having the taper angle β (the second taper angle) smaller than the taper angle α (α>β).

As described above, the taper angle α of the basal side portion of the cam groove is greater than the taper angle β of the open side portion. Therefore, the cam pin easily falls down from the basal side portion of the cam groove and does not easily have a dent on the basal side portion of the cam groove when the lens barrel has a strong impact. The cam pin that has fallen down contacts the open side portion of the cam groove having the narrower taper angle β of the open side portion, and is held so as not to fall down from the open side portion of the cam groove. The shape of the cam pin engagement portion which engages with the cam groove is a substantive spherical shape or a round shape. Therefore, since the cam pin easily falls down from the basal side portion of the cam groove when the lens barrel has the impact, the basal side portion of the cam groove does not easily have a dent. The open side portion of the cam groove and the cam pin does not contact each other at the time of the normal driving. Therefore, even if the open side portion of the cam groove has the dent caused by the impact of the lens barrel, the cam pin is not influenced by the dent at the time of the normal driving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-182052, filed on Aug. 17, 2010, and Japanese Patent Application No. 2010-204664, filed on Sep. 13, 2010, which are hereby incorporated by reference herein in their entirety.

What is claimed is:

1. A lens barrel comprising:
a lens holding frame that includes a cam pin and that holds a lens;
a guide cylinder configured to linearly guide the lens holding frame; and
a cam cylinder configured to move the lens holding frame in an optical axis direction by rotating with respect to the guide cylinder,
wherein a cam groove that the cam pin engages with is formed on the cam cylinder,
wherein the cam groove includes a basal side portion having a first taper angle and an open side portion having a second taper angle smaller than the first taper angle, and
wherein the cam pin is configured to contact the basal side portion without contacting the open side portion of the cam groove when the lens holding frame does not have an impact, and contact the open side portion without contacting the basal side portion of the cam groove when the lens holding frame has the impact.

2. The lens barrel according to claim 1,
wherein the cam pin has a spherical shape or a round shape at a part of contacting the cam groove.

3. The lens barrel according to claim 1,
wherein an end portion of the cam pin has a flat surface.

4. The lens barrel according to claim 1,
wherein the guide cylinder is provided inside the lens holding, and the cam cylinder is provided outside of the guide cylinder.

* * * * *